United States Patent [19]

Tieke et al.

[11] Patent Number: 4,904,734
[45] Date of Patent: Feb. 27, 1990

[54] DEHYDROGENATED POLYSPIROHEPTADIENE

[75] Inventors: Bernd Tieke, Marly; Sheik A. C. Zahir, Oberwil, both of Switzerland

[73] Assignee: Ciba-Geigy Corporation, Ardsley, N.Y.

[21] Appl. No.: 322,143

[22] Filed: Mar. 13, 1989

Related U.S. Application Data

[62] Division of Ser. No. 95,075, Sep. 11, 1987, Pat. No. 4,840,999.

[30] Foreign Application Priority Data

Sep. 19, 1986 [CH] Switzerland .................. 3756/86

[51] Int. Cl.$^4$ ............................................. C08L 77/00
[52] U.S. Cl. .................................... 525/184; 525/196; 525/236
[58] Field of Search ................... 525/184, 196, 236

[56] References Cited

U.S. PATENT DOCUMENTS 3,856,752 12/1974 Bateman et al. ................. 260/65

OTHER PUBLICATIONS

P. E. Blatz, J. Poly. Sci., Part C., 4, 1335, (1963).
S. Hayashi et al., J. Poly. Sci., Poly. Phys. Ed., 17, 1995, (1979).
O. Ohara et al., J. Poly. Sci., Poly. Chem. Ed., 11, 1917, (1973).

*Primary Examiner*—Joseph L. Schofer
*Assistant Examiner*—Bernard Lipman
*Attorney, Agent, or Firm*—Luther A. R. Hall

[57] ABSTRACT

Dehydrogenated poly(spiro[2,4]hepta-4,6-diene) which is insoluble in organic solvents, has an electrical conductivity of at least $10^{-10}\,S\times cm^{-1}$, and contains, relative to the total number of recurring structural units in the polymer, 0–90 mol % of the recurring structural units of the formulae I and II (I)

-continued
and (II)

in which $R^1$ is in each case a hydrogen atom or an alkyl group having 1 to 4 C atoms, and 10–100 mol % of at least one of the recurring structural units of the formulae III to VI (III)

and (IV)

(V)

and (VI)

in which $R^1$ is as defined in formula I or II and $X^-$ is a bromide or iodide ion or an anion of a Lewis or protonic acid, is obtained by treating poly(spiro[2,4]-hepta-4,6-diene) with bromine, iodine or a Lewis or proton-donating acid, and can be used in an electrically conducting material for the production of, for example, conductors, electrodes, batteries or semiconductor components.

5 Claims, No Drawings

DEHYDROGENATED POLYSPIROHEPTADIENE

This is a divisional of application Ser. No. 095,075, filed Sep. 11, 1987, now U.S. Pat. No. 4,840,999, issued on June 20, 1989.

The present invention relates to degydrogenated poly-(spiro[2,4]hepta-4,6-diene) which is insoluble in organic solvents, to a process for its preparation and to its use, in particular as a semiconductor.

It is known from the Journal of Polymer Science, part c, no. 4, pages 1,335 to 1,346, that dehydrogenated polycyclopentadiene which is electrically conducting is obtained by brominating polycyclopentadiene with the elimination of hydrogen bromide. Both the stability to air and the electrical conductivity of the dehydrogenated polycyclopentadiene are unsatisfactory. It is also known from the Journal of Polymer Science, Polymer Physics Edition, volume 17 (1979), pages 1,995–2,006, that 1,4-units and 1,2-units

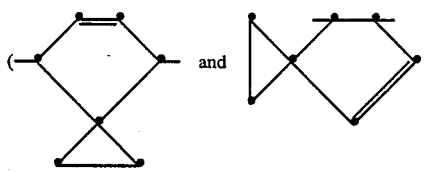

are present in poly-(spiro[2,4]hepta-4,6-diene).

It has now been found that dehydrogenated poly-(spiro[2,4]hepta-4,6-diene) which has an improved conductivity and stability in air is obtained by treating poly-(spiro[2,4]hepta-4,6-diene) with oxidizing agents, such as halogens or Lewis or proton-donating acids, although the formation of a planar, conjugated $\pi$-system is sterically hindered by the cyclopropane group and the content of 1,2-units in the poly-(spiro[2,4]hepta-4,6-diene).

The present invention therefore relates to dehydrogenated poly(spiro[2,4]hepta-4,6-diene) which is insoluble in organic solvents, has an electrical conductivity of at least $10^{-10}$ S×cm$^{-1}$ and contains, relative to the total number of recurring structural units in the polymer, 0–90 mol% of the recurring structural units of the formulae I and II

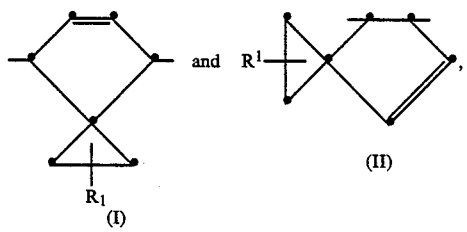

in which R$^1$ is in each case a hydrogen atom or an alkyl group having 1 to 4 C atoms, and 10–100 mol% of at least one of the recurring structural units of the formulae III to VI

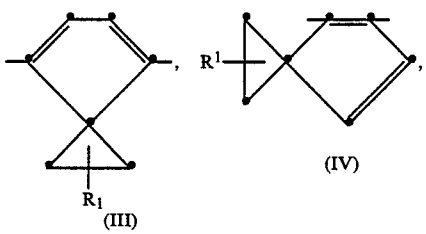

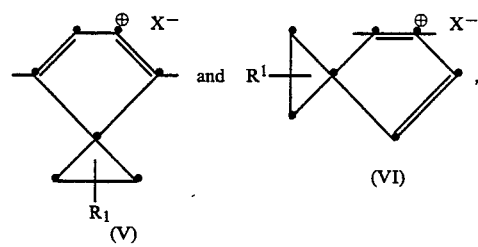

in which R$^1$ is as defined in formula I or II and X$^-$ is a bromide or iodide ion or an anion of a Lewis or protonic-acid.

The dehydrogenated poly(spiro[2,4]hepta-4,6-diene) preferably contains 0–80 mol%, in particular 0–70 mol%, of the recurring structural units of the formulae I and II and 20–100 mol%, in particular 30–100 mol%, of at least one of the recurring structural units of the formulae III to VI.

In a particular embodiment, the dehydrogenated poly(spiro[2,4]hepta-4,6-diene) contains 0–50 mol% of the recurring structural units of the formulae I and II and 50–100 mol% of at least one of the recurring structural units of the formulae III to VI.

In the formulae I to VI R$^1$ is preferably a hydrogen atom in each case.

X$^-$ in, the formulae V and VI is in each case preferably an iodide ion or an anion of a Lewis acid, particularly an iodide ion.

Dehydrogenated poly(spiro[2,4]hepta-4,6-diene) which is insoluble in organic solvents and has the recurring structural units of the formulae I to VI can be prepared, for example, by treating a poly(spiro[2,4]hepta-4,6-diene) which has an average molecular weight of $5 \times 10^2$ to $10^6$ and contains the recurring structural units of the formulae I and II with bromine, iodine or a Lewis or protonic acid as an oxidizing agent, in such a way that at least 10 mol% of the total recurring structural units of the formulae I and II are converted into conjugated structural units of the formulae III to VI.

It is preferable to employ, in the process according to the invention, a poly(spiro[2,4]hepta-4,6-diene) containing the recurring structural units of the formulae I and II in which R$^1$ is in each case a hydrogen atom.

Examples of suitable Lewis acids which can be employed in the process according to the invention are SbCl$_5$, SbF$_5$, AsF$_5$, AsCl$_5$, BiCl$_5$, BF$_3$, BCl$_3$ and the bromides of phosphorus and aluminium and the chlorides of phosphorus, aluminium, iron and tin. It is preferable to employ SbCl$_5$, SbF$_5$ and AsF$_5$ as the Lewis acids.

Suitable protonic acids which can be employed in the process according to the invention are organic acids, for example methane sulphonic acid, trifluoromethanesulfonic acid, benzene sulfonic acid or p-toluene sulfonic acid, or inorganic acids, for example hydrogen fluoride, chloride or bromide, oxygenated acids of nitrogen, chlorine, sulfur or phosphorus and complex acids containing the anion of the formula $MX_n^-$, in which M is a metal or metalloid atom and X is a halogen atom, preferably fluorine or chlorine, and n is 4,5 or 6 and is higher by one than the valency of M, or containing the anion of the formula $SbF_5(OH)^-$. M is preferably a boron or bismuth atom and very particularly an antimony, arsenic or phosphorus atom. Examples of anions $MX_n^-$ which can be present in these complex acids are $BiCl_6^-$ or $BF_4^-$, but particularly preferably $PF_6^-$, $SbF_6^-$ or $AsF_6^-$.

It is preferable to use iodine or a Lewis acid, particularly iodine, as the oxidizing agent in the process according to the invention.

The oxidizing agents used in the process according to the invention are preferably employed in amounts such that at least one mol of the appropriate oxidizing agent is present per mol of monomer unit in the poly(spiro[2,4]hepta-4,6-diene).

The dehydrogenation of the poly(spiro[2,4]hepta-4,6-diene) can be carried out either in solution, in which case the solvents employed are organic solvents which do not react with the oxidizing agents, for example carbon tetrachloride, chloroform, cyclohexane, 1,2-dichloroethane, benzene or toluene, or in a solid form, for example in the form of a film or coating.

The dehydrogenated poly(spiro[2,4]hepta-4,6-diene) obtained in the process according to the invention is a solid substance of a dark to black colour which is insoluble in organic solvents and has an electrical conductivity of at least $10^{-10}$ S×cm$^{-1}$. The dehydrogenated poly-(spiro[2,4]hepta-4,6-diene) according to the invention preferably has an electrical conductivity of at least $10^{-9}$ in particular $10^{-8}$, S×cm$^{-1}$. The dehydrogenated poly(spiro[2,4]hepta-4,6-diene) according to the invention can be employed as an electrically conducting material for the production of conductors, electrodes, batteries, switch gear and semiconductor components and in imparting an antistatic finish or an electromagnetic screening to electronic components.

As an electrically conducting material, the dehydrogenated poly(spiro[2,4]hepta-4,6-diene) is processed in an advantageous manner together with polymers which are soluble in organic solvents, preferably in the form of electrically conducting films or coatings.

The present invention therefore also relates to compositions containing dehydrogenated poly(spiro[2,4-]hepta-4,6-diene) and polymer which is soluble in an organic solvent.

Compositions of this type can be prepared, for example, by subjecting mixtures of poly(spiro[2,4]hepta-4,6-diene) and a polymer soluble in an organic solvent, preferably together in the form of films or coatings, to treatment with an oxidizing agent indicated above. The composition can also be obtained, however, by adding dehydrogenated poly(spiro[2,4]hepta-4,6-diene), for example present in the form of powder, to the appropriate polymer in the melt or in the form of solutions.

The compositions preferably contain at least 10% by weight, in particular at least 25% by weight, of dehydrogenated poly(spiro[2,4]hepta-4,6-diene), relative to the total weight of dehydrogenated poly(spiro[2,4]hepta-4,6-diene) and polymer soluble in the organic solvents, for example a polycyclopentadiene or a polyimide containing phenylindane radical.

In the context of the present invention, polymers soluble in organic solvents are to be understood as meaning polymers having a solubility of at least 10 g of polymer per litre of organic solvent, preferably 20 g of polymer per litre of organic solvent.

As polymers soluble in organic solvents, the compositions according to the invention preferably contain a polycyclopentadiene or a polyimide containing phenylindane radicals.

The polycyclopentadiene present in the composition according to the invention is known and can be prepared, for example, in accordance with the process described in the Journal of Polymer Science, Polym. Chem. Ed., 11 (1973), 1917, by polymerizing cyclopentadiene, using $TiCl_4$ as a cationic catalyst. In general, a polycyclopentadiene having an average molecular weight of 500 to 1,000,000 is used for the compositions.

Examples of solvents which can be used for polycyclopentadiene are dioxane, tetrahydrofuran, chlorobenzene, 1,2-dichloroethane, methylene chloride, chloroform, toluene or benzene.

Suitable polyimides soluble in organic solvents and containing a phenylindane radical are those in which at least 10 mol% of the recurring structural units contain a phenylindane radical. Polyimides of this type are disclosed in German Patent No. 2,446,383 and consist essentially of the recurring unit of the formula

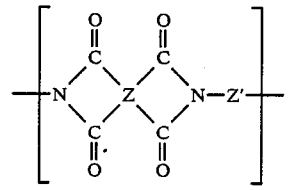

in which the four carbonyl groups are attached to different carbon atoms and each pair of carbonyl groups is in the orthoposition or peri-position relative to the other, Z is a tetravalent radical containing at least one aromatic ring and Z′ is a divalent organic radical selected from aromatic, aliphatic, alkyl-aromatic, cycloaliphatic and heterocyclic radicals, combinations thereof and radicals having bridge groups containing oxygen, sulfur, nitrogen, silicon or phosphorus, subject to the proviso that (1)

(A) in 0 to 100 mol% of the total number of recurring polyimide units, Z is a phenylindane radical or the structural formula

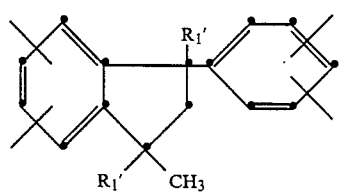

in which $R_1'$ is hydrogen or an alkyl radical having 1 to 5 carbon atoms, and (B) in 0 to 100 mol% of such units, Z′ is a phenylindane radical of the structural formula

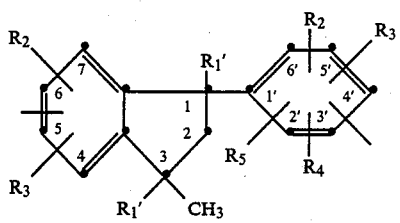

in which

R$_1'$ is hydrogen or an alkyl group having 1 to 5 carbon atoms and

R$_2$, R$_3$ and R$_5$ independently of one another are hydrogen, halogen or alkyl groups having 1 to 4 carbon atoms, and (2) at least 10 mol% of the total number of the radicals Z and Z' are phenylindane radicals.

As regards the preparation and the preferred fields of these polyimides, reference should be made to the description in this patent specification.

The following should be mentioned as examples of organic solvents for the soluble polyimides: N,N-dimethylformamide, N,N-dimethylacetamide, N-methyl-2-pyrrolidone, N,N-dimethylformamide, N,N-diethylacetamide, N-methylcaprolactam, dioxane, dimethyl sulphoxide, tetramethylurea, pyridine, dimethyl sulfone, hexamethylphosphoric amide, tetramethylene sulfone, formamide, N-methylformamide, γ-butyrolactone, tetrahydrofuran, m-cresol, phenol, 2-methoxyethyl acetate, 1,2-dimethoxyethane, bis-(2-methoxyethyl) ether, chloroform and nitrobenzene.

The compositions according to the invention are suitable for the production of self-supporting, electrically conducting films having a high glass transition temperature and ultimate tensile strength. Films of this type can be used in the field of electronics or microelectronics, for example as conductive composite materials in the production of electrical conductors, electrodes, batteries, switch gear or semiconductor components, and in imparting an antistatic finish or electromagnetic screening to electronic components.

The polyspiroheptadiens (PSHD) A, B and C used in the following examples were prepared in accordance with the instructions in the literature. PSHD-A and PSHD-B were synthesized by the method of O. Ohara et al, J. Polym. Sci., Polym. Chem. Ed 11 (1973) 1917, and PSHD-C was synthesized by the method of S. Hayashi et al, J. Polym. Sci., Polym. Phys. Ed. 17 (1979) 1995.

TABLE 1

Polyspiroheptadiene - initiators used and characterization of the samples.

| PSHD | Initiator | Yield | 1,4-Content*[1] (%) | C,H found*[2] | $\overline{M_n}$*[3] |
|------|-----------|-------|---------------------|---------------|-----|
| A | TiCl$_4$ | 98% | 52.0 | C = 90.20% H = 8.60% | 62,000 |
| B | TiCl$_4$/ CCl$_3$COOH | 98% | 35.1 | C = 91.04% H = 8.92% | 14,000 |
| C | O$_3$C$^+$BF$_4^-$ | 65% | 69.6 | C = 89.26% H = 8.91% | 4,300 |

*[1]Determined by $^1$H—NMR spectroscopy
*[2]Found: C = 91.25%; H = 8.75%
*[3]Number average value of the molecular weight, determined by viscometry on the basis of [η] = 4.5 × 10$^{-9}$$\overline{M_n}$ 1.71 (T = 30° C.; toluene), [S. Hayashi et al., J. Polymer Sci. Polym. Phys. Ed. 17 (1979) 1995]

EXAMPLE 1:

4.61 g of PSHD-A [50 mmol per monomer unit] are dissolved, under N$_2$, in 100 ml of anhydrous CCl$_4$ in a 3-necked flask equipped with a stirrer, a reflux condenser and a dropping funnel. A solution of 7.99 g [50 mmol] of Br$_2$ in 20 ml of CCl$_4$ is put into the dropping funnel. The bromine solution is then added dropwise, with stirring, at a temperature kept constant at 20° C. A yellowish precipitate is formed. When the dropwise addition is complete, the mixture is boiled under reflux for 18 hours, with stirring. The precipitate gradually turns dark. The mixture is then cooled and the precipitate is filtered off with suction in an atmosphere of nitrogen. It is rinsed with three times 50 ml of CCl$_4$. The product is dried in a high vacuum at 30° C.

Yield: 8.1 g of a black, insoluble powder.
Specific conductivity σ: see Table 2.
Elementary analysis: found C: 45.78%, H: 3.92%, Br: 43.49%.

EXAMPLE 2:

1.84 g of PSHD-A [20 mmol per monomer unit] are dissolved, under N$_2$, in 100 ml of anhydrous CCl$_4$ in a 3-necked flask equipped with a stirrer, a reflux condenser and a dropping funnel. A solution of 5.07 g [20 mmol] of I$_2$ in 200 ml of CCl$_4$ is put into the dropping funnel. The iodine solution is then added dropwise, with stirring, while the temperature is kept constant at 20° C. A violet-black precipitate is formed after a short time. When the dropwise addition is complete, the mixture is boiled under reflux for 18 hours, with stirring, and the product is worked up as described in Example 1.

Yield: 4.6 g of a black, insoluble powder.
Specific conductivity: see Table 2.
Elementary analysis: found C: 34.17%, H: 3.19%, I: 59.68%.

TABLE 2

| | Specific conductivity σ of the dehydrogenated PSHP after various periods of storage | | |
|---|---|---|---|
| Sample from example | σ[S × cm$^{-1}$]* | | |
| | Immediately after synthesis | After 10 days | After 4 weeks |
| 1 | 1.4 × 10$^{-6}$ | ** | ** |
| 2 | 1.9 × 10$^{-6}$ | 1.9 × 10$^{-6}$ | 2.0 × 10$^{-6}$ |
| 3 | 1.1 × 10$^{-6}$ | 1.2 × 10$^{-6}$ | 1.3 × 10$^{-6}$ |
| 4 | 7.8 × 10$^{-7}$ | 2.6 × 10$^{-6}$ | 4.6 × 10$^{-6}$ |
| 5 | 1.8 × 10$^{-5}$ | 3.5 × 10$^{-5}$ | 3.3 × 10$^{-5}$ |
| 6 | 1.6 × 10$^{-6}$ | ** | ** |
| 7 | 2.1 × 10$^{-8}$ | 8.0 × 10$^{-7}$ | 1.6 × 10$^{-6}$ |
| 8 | 1.1 × 10$^{-5}$ | 7.6 × 10$^{-7}$ | 1.6 × 10$^{-6}$ |

*σ was determined on powder mouldings at room temperature
**Not determined

EXAMPLE 3:

The procedure is as in Example 2, but PSHD-B is used instead of PSHD-A.

Yield: 4.6 g of a black, insoluble powder.
Specific conductivity σ: see Table 2.
Elementary analysis: found: C: 35.18%, H: 2.94%, I: 58.90%.

EXAMPLE 4:

The procedure is as in Example 2, but PSHD-C is used instead of PSHD-A.

Yield: 4.3 g of a black, insoluble powder.
Specific conductivity σ: see Table 2.

Elementary analysis: found: C: 32.01%, H: 3.02%, I: 63.03%.

EXAMPLE 5:

The procedure in as in Example 2, but modified in that 12.70 g [50 mmol] of $I_2$ in 500 ml of $CCl_4$ are added dropwise.

Yield: 6.3 g of a black, insoluble powder.
Specific conductivity $\sigma$: see table 2.
Elementary analysis: found: C: 26.22%, H: 2.48%, I: 67.99%.

EXAMPLE 6:

1.84 g of PSHD-A [20 mmol of monomer unit] are dissolved, under $N_2$, in a three-necked flask equipped with a stirrer, a reflux condenser and a dropping funnel, in 150 ml of cyclohexane dried over $P_2O_5$. A mixture of 1.45 ml [20 mmol] of $SbF_5$ and 20 ml of cyclohexane dried over $P_2O_5$ is put into the dropping funnel. The $SbF_5$ mixture is then added dropwise, with stirring, at a temperature kept constant at 20° C. A black precipitate is formed immediately. When the dropwise addition is complete, the mixture is stirred for a further hour. The product is then filtered off with suction in an atmosphere of nitrogen. It is rinsed three times with anhydrous cyclohexane. The product is then dried in a high vacuum at 30° C.

Yield: 4 g of a black, insoluble powder.
Specific conductivity $\sigma$: see Table 2.
Elementary analysis: found: C: 16.19%, H: 2.86%, Sb: 47.90% F: 17.01%.

EXAMPLE 7:

1.84 g PSHD-A [20 mmol of monomer unit] are dissolved, under $N_2$, in 150 ml of anhydrous $CCl_4$ in a 3-necked flask equipped with a stirrer, a reflux condenser and a dropping funnel. A solution of 5.98 g [20 mmol] of $SbCl_5$ in 20 ml of $CCl_4$ is put into the dropping funnel. The $SbCl_5$ solution is then added dropwise, with stirring, at a temperature kept constant at 20° C. A deep brown precipitate is formed immediately. When the dropwise addition is complete, the mixture is boiled under reflux for a further 18 hours, and the product is worked up as described in Example 1.

Yield: 4.7 g of a black, insoluble powder.
Specific conductivity $\sigma$: see Table 2.
Elementary analysis: found: C: 34.86%, H: 2.98%, Cl: 31.30%.

EXAMPLE 8:

The procedure is as in Example 7, but modified in that 11.96 g [40 mmol] of $SbCl_5$ in 15 ml of $CCl_4$ are added dropwise.

Yield: 5.9 g of black, insoluble powder.
Specific conductivity $\sigma$: see Table 2.

Elementary analysis: found: C: 31.59%, H: 2.03%, Cl: 33.54%, Sb: 28.6%.

EXAMPLE 9:

1.0 g of $I_2$ crystals are initially placed in a thoroughly dried 700 ml vessel, flushed with argon and equipped with a stirrer. Glass supports[1] coated with PSHD-A (film thickness approx. 1 μm) are then put into the vessel. After about 1 hour the PSHD films assume a brown colour. After about 10 hours they are completely black and exhibit a metallic reflection.

Increase in weight after 21 hours: 3.89 mg of Iodine/mg of polymer. $\sigma(RT)$ (after 21 hours) 2.4 $\times 10^{-6} S \times cm^{-1}$ (determined on powder mouldings).

[1] Coating was effected by spin coating (concentration of the PSHD solution: 0.1 g/ml of toluene; speeds of rotation: 30 seconds at 1200 r.p.m. and then 30 seconds at 3000 r.p.m.).

EXAMPLE 10:

The procedure is as in Example 9, but modified in that a glass support which has been coated with a polymer mixture consisting of PSHD-A and DAPI-polyimide containing the following recurring structural unit:

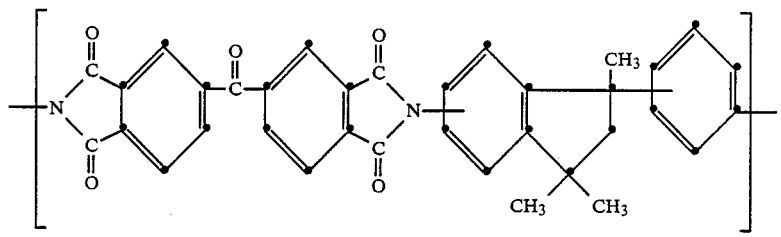

and having an intrinsic viscosity of 0.84 dl/g, measured at 25° C. in N-methyl pyrrolidone, is used. The coating is effected by spin coating (concentration of the polymer solution: 0.1 g of mixture/ml or 1,2-dichloroethane; speed of rotation: 30 seconds at 1,200 r.p.m. and then 30 seconds at 3,000 r.p.m.). The composition of the polymer mixtures and the characteristic properties of the films treated with iodine can be seen from Table 3.

TABLE 3

Composition of the mixed films composed of PSHD and DAPI-polyimide and their characteristic properties after iodine treatment

| Proportion of PSHD present in the mixed film (% by wt.) | Increase in weight after 47 hours (mg of iodine/mg of polymer mixture) | $\sigma RT$ [S × $cm^{-1}$] |
|---|---|---|
| 10 | 0.37 | 2.2 × $10^{-9}$ |
| 25 | 0.76 | 2.8 × $10^{-8}$ |
| 75 | 1.83 | 1.1 × $10^{-6}$ |
| 90 | 2.18 | 1.7 × $10^{-6}$ |

EXAMPLE 11:

The procedure is as in Example 9, but modified in that glass supports are used which have been coated[2] with a mixed film composed of polycyclopentadiene and PSHD-A in a 1:1 ratio by weight (thickness about 15 μm).

[2] The coating is effected by applying the polymer solution (4 g of mixture/30 ml of toluene) by means of a 100 μ doctor blade.

After approx. 1 hour the mixed films assume a brown colour. After 24 hours they are completely black and exhibit a metallic reflection.

Specific conductivity: $\sigma_{RT}$ (after 48 hours): $6.1 \times 10^{-5}$ S×cm$^{-1}$ (determined on powder mouldings).

The polycyclopentadiene used above was synthesized using TiCl$_4$ as a cationic initiator analogously to the working instructions for the preparation of polyspiroheptadiene in J. Polymer Sci., Poly. Chem. Ed., 11 (1973) 1917.

Yield: 74% of theory; 1,4-content$\geq$99% (determined by NMR spectroscopy). Molecular weight 28,300 (determined by viscometry).

Elementary analysis: Found: C 89.77% H 9.03% Calculated: C 90.85% H 9.15%.

What is claimed is:

1. A composition containing a dehydrogenated poly(spiro[2,4]hepta-4,6-diene) which is insoluble in organic solvents, has an electrical conductivity of at least $10^{-1}$ S×cm$^{-1}$, and contains, relative to the total number of recurring structural units in the polymer, 0–90 mol% of the recurring structural units of the formulae I and II

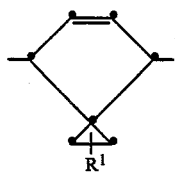

(I)

and

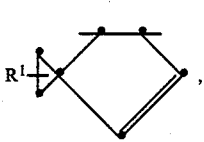

(II)

in which R$^1$ is in each case a hydrogen atom or an alkyl group having 1 to 4 C atoms, and 10–100 mol% of at least one of the recurring structural units of the formulae III to VI

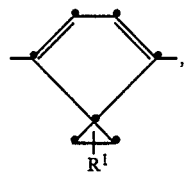

(III)

and

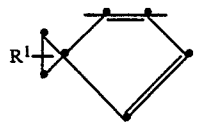

(IV)

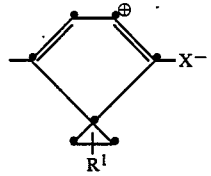

(V)

and

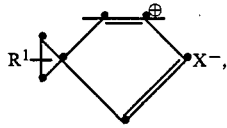

(VI)

in which R$^1$ is as defined in formula I or II and X$^-$ is a bromide or iodide ion or an anion of a Lewis or protonic acid, and a polymer which is soluble in organic solvents.

2. A composition according to claim 1 wherein the dehydrogenated poly(spiro[2,4]hepta-4,6-diene) contains 0–80 mol% of the recurring structural units of formulas I and II and 20–100 mol% of at least one of the recurring structural units of the formulas III to VI.

3. A composition according to claim 1 wherein the dehydrogenated poly(spiro[2,4]hepta-4,6-diene) contains 0–50 mol% of the recurring structural units of formulas I and II and 50–100 mol% of at least one of the recurring structural units of the formulas III to VI.

4. A composition according to claim 1, wherein the polymer soluble in organic solvents is a polycyclopentadiene.

5. A composition according to claim 1, wherein the polymer soluble in organic solvents is a polyimide containing phenylidane radicals.

* * * * *